(12) United States Patent
Hale et al.

(10) Patent No.: US 7,062,967 B2
(45) Date of Patent: Jun. 20, 2006

(54) FUEL LEVEL SENSOR

(75) Inventors: Donna M Hale, Clinton Township, MI (US); Nancy M Isles, Commerce Township, MI (US); Dan P Borza, Windsor (CA)

(73) Assignee: DaimlerChrysler Corporation, Auburn Hills, MI (US)

( * ) Notice: Subject to any disclaimer, the term of this patent is extended or adjusted under 35 U.S.C. 154(b) by 105 days.

(21) Appl. No.: 10/614,996

(22) Filed: Jul. 8, 2003

(65) Prior Publication Data

US 2005/0005696 A1  Jan. 13, 2005

(51) Int. Cl.
*G01F 23/296* (2006.01)
*G01F 23/76* (2006.01)

(52) U.S. Cl. .............. 73/319; 73/290 V; 73/314; 73/322.5

(58) Field of Classification Search .............. 73/290 V, 73/305, 322.5, 314, 319; 340/621, 623
See application file for complete search history.

(56) References Cited

U.S. PATENT DOCUMENTS

| | | | | |
|---|---|---|---|---|
| 4,627,283 A | * | 12/1986 | Nishida et al. ............. 73/313 |
| 4,702,316 A | * | 10/1987 | Chung et al. ........... 166/272.3 |
| 5,184,510 A | * | 2/1993 | Rossman ................ 73/290 V |
| 5,189,911 A | * | 3/1993 | Ray et al. .................... 73/292 |
| 5,299,456 A | * | 4/1994 | Steiner ....................... 73/308 |
| 5,351,414 A | * | 10/1994 | Cogliano .................... 33/719 |
| 5,483,831 A | * | 1/1996 | Steiner ....................... 73/313 |
| 5,743,135 A | * | 4/1998 | Sayka et al. ................. 73/293 |
| 6,215,226 B1 | | 4/2001 | Durkee |
| 6,229,476 B1 | * | 5/2001 | Lutke et al. ................ 342/124 |
| 6,236,142 B1 | | 5/2001 | Durkee |
| 6,250,137 B1 | | 6/2001 | Takahashi et al. |
| 6,339,959 B1 | * | 1/2002 | Natapov ..................... 73/239 |
| 6,353,407 B1 | * | 3/2002 | Donnelly .................. 342/124 |
| 6,409,669 B1 | | 6/2002 | Hager et al. |
| 6,523,404 B1 | * | 2/2003 | Murphy et al. .............. 73/305 |

FOREIGN PATENT DOCUMENTS

| | | | | | |
|---|---|---|---|---|---|
| FR | 2656688 | * | 7/1991 | ............. 73/290 V |
| GB | 2152667 A | * | 8/1985 | |
| JP | 55-69024 | * | 5/1980 | ............. 73/290 V |
| JP | 63-205521 | * | 8/1988 | ............... 250/577 |
| JP | 1-295127 | * | 11/1989 | ................. 73/747 |

* cited by examiner

*Primary Examiner*—Daniel S. Larkin
(74) *Attorney, Agent, or Firm*—Ralph E. Smith

(57) ABSTRACT

An apparatus and method are provided for determining the fuel level in a fuel tank. The apparatus includes an acoustic transducer arranged to transmit an acoustic signal and receive a reflected signal. A float remains buoyant at the surface of the fuel in the tank and has a reflective portion for receiving the acoustic signal and reflecting the reflected signal therefrom. An interface circuit is connected to the transducer and measures an elapsed time between transmitting the acoustic signal and receiving the reflected signal. The interface then produces an output as a function of the elapsed time that is indicative of the fuel level in the fuel tank.

12 Claims, 1 Drawing Sheet

FUEL LEVEL SENSOR

SUMMARY OF THE INVENTION

This invention relates generally to an apparatus for determining the level of liquid fuel in a fuel tank.

BACKGROUND

Electrical fuel level sensors typically use a float arm arrangement to measure the level of fuel in a tank. While the float arm arrangement is simple and generally effective, it does have some properties which create issues in certain applications.

As a first issue, a fuel tank with a float arm sensor must provide a volume of space through which the float arm swings as the fuel level varies. This need for volume places a design limitation on the shape of the fuel tank. Since a fuel tank is generally a large object mounted within a vehicle, the volume of space needed for a swing arm may be in contention with space needed to satisfy other goals. These other goals may include, by way of example, aesthetic styling of the vehicle or space needed to engineer for crash worthiness.

As a second issue, a float arm generally has several moving parts. These parts include a float pivotally mounted to one end of a float arm. The other end of the float arm is typically attached to a potentiometer or array of switched resistive pads. The float arm moving up and down causes an electrical wiper to sweep across a resistive element of the potentiometer or array of switched resistive pads, thereby electrically indicating the level of fuel in the tank. Among these moving parts, there is the possibility of binding between them. There is also the possibility of the fuel, or additives thereto, chemically deteriorating the potentiometer or array of switched resistive pads, thereby causing an erroneous fuel level indication.

BRIEF SUMMARY OF THE INVENTION

Accordingly, one aspect the present invention provides a fuel level sensor that operates in less space than a float arm sensor.

Another aspect of the present invention is to provide a fuel level sensor with a single moving fuel measuring component.

Yet another aspect of the present invention is to provide an electrical measuring element that is protected from chemical interaction with the fuel and fuel additives.

In accordance with the foregoing aspects of the invention, an apparatus is shown that provides an electrical indication of the fuel level in a fuel tank. The apparatus has an acoustic transducer for transmitting an acoustic signal and receiving a reflected signal. A float is buoyant at the surface of the fuel in the tank and has a reflective portion for receiving the acoustic signal and reflecting the reflected signal therefrom. An interface circuit is connected to the transducer and measures an elapsed time from transmitting the acoustic signal to receiving the reflected signal. The interface then produces an electrical signal at an output, where the electrical signal is function of the elapsed time and indicative of the fuel level in the fuel tank.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF DRAWINGS

The present invention will become more fully understood from the detailed description and the accompanying drawings, wherein:

The FIGURE is a cross-sectional view of fuel tank containing a fuel level sensor.

DETAILED DESCRIPTION OF THE PREFERRED EMBODIMENTS

Figure 1:
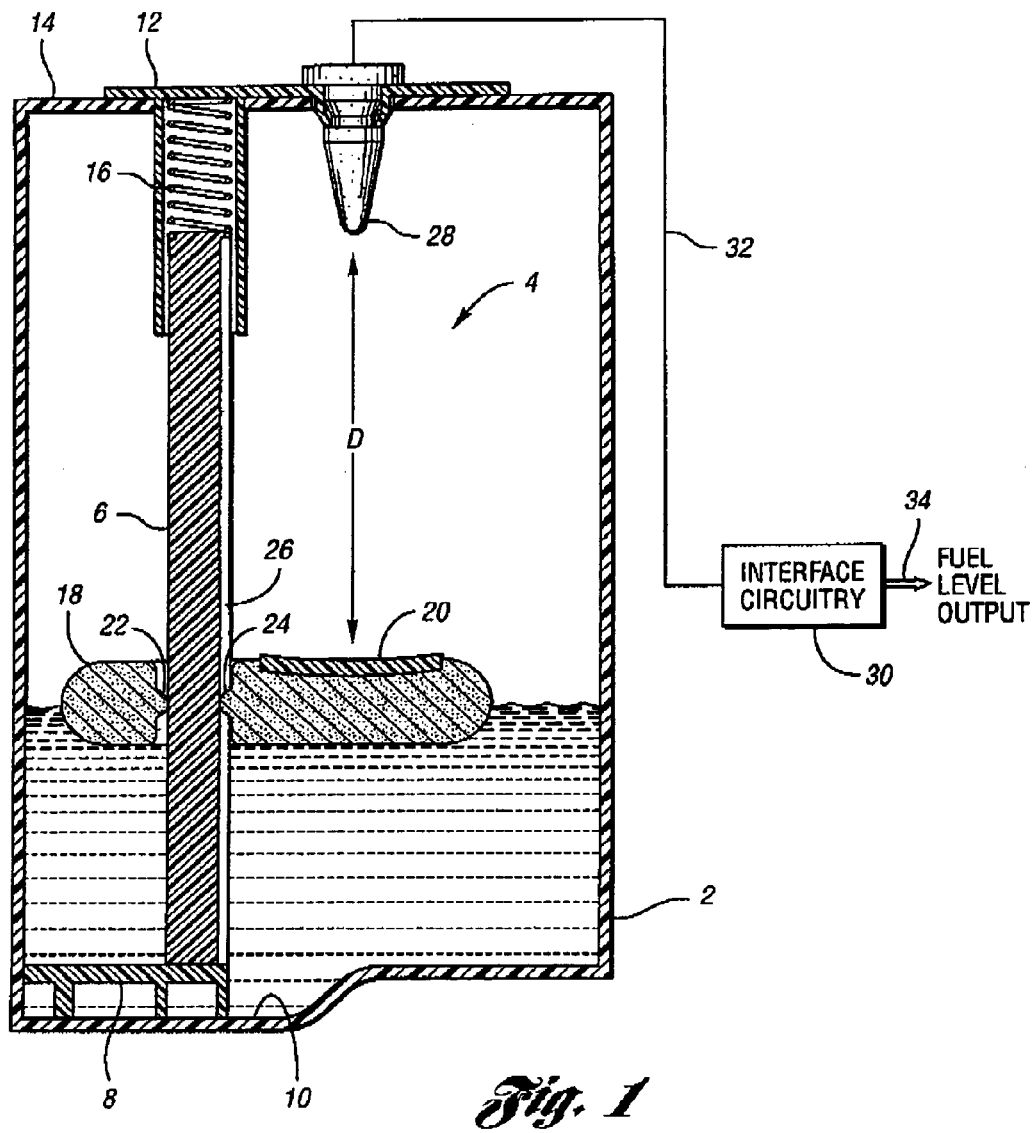

The FIGURE illustrates a fuel tank 2 containing a fuel level sensor 4. A centering rod 6 extends to a base 8, which is set on a bottom portion 10 of the fuel tank 2. A housing plate 12 is made integral to a top portion 14 of the fuel tank 2 such that fuel vapors are prevented from inadvertently escaping from around the housing plate 12. A spring 16 continuously urges the centering rod 6 against the base 8 to accommodate dimensional variances in the fuel tank 2 due to manufacturing tolerances and deformation from internal and external forces.

A float 18, which may be made from a natural or synthetic material, such as an elastomer having a density from about 9.9–12.6 lb/ft$^3$, with a reflective pad 20, is adapted for vertical travel along the centering rod 6 dependent on the fuel height in the vehicle fuel tank 2. The float 18 may have a friction-reducing feature 22 to reduce friction or binding between the float 18 and the centering rod 6. An indexing feature 24 cooperates with a mating feature 26 to prevent the float 18 from rotating about the centering rod.

An acoustic transducer 28, such as an electromechanical or a piezoelectric transducer, is attached to the spring housing plate 12 in a top portion 14 of the fuel tank 2. The transducer 28 is disposed directly above the reflective portion 20 of the float 18. The reflective portion 20 may be formed integral to the float with a reflective material such as epoxy or metal, although other materials may also be used. In one aspect of the invention, the reflective portion 20 has a concave surface.

The transducer 28 is excited by interface circuitry 30 to transmit an acoustic signal along an axis normal to the surface of the fuel and toward the reflective pad 20. An acoustic reflected signal is reflected from the reflective pad 20 to the transducer 28. The interface circuitry 30 determines the elapsed time from the transducer 28 transmitting the signal until the transducer receives the reflected signal. In determining the elapsed time, the interface circuitry may take into consideration parasitic delays in the transducer 28. Lead 32 connects the transducer 28 to the interface circuitry 30.

Interface circuitry 30 implements a transfer function to convert the elapsed time to a distance measurement D. The distance measurement D is indicative of the distance between the transducer fixed near the top of the fuel tank 2 and the reflective portion 20 of the float 18. As is well known in the art, once D is established and the dimensions of the fuel tank 2, transducer 28, float 18 and reflective surface 20 are known, the height and volume of remaining fuel can be determined. Interface circuitry 30 has an output 34 for electrically producing, such as by voltage, current, resistance, or network message, a signal indicative of the fuel level in the tank 2. This electrical signal may then be used by other devices (not shown) such as a fuel level indicator or engine control system.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

We claim:

1. A fuel tank system providing an electrical indication of fuel level in the fuel tank, said system comprising:
   a fuel tank having a bottom surface and a top surface in spaced relation thereto;
   an acoustic transducer mounted in said top surface, said transducer transmitting an acoustic signal and receiving a reflected signal, said signals traveling along an axis normal to the surface of the fuel;
   a float for remaining buoyant at the surface of the fuel in the tank, said float having a reflective portion for receiving said acoustic signal and reflecting therefrom said reflected signal;
   a centering rod parallel to said axis and having an upper end and a lower end, said upper end of said centering rod being fixed at said top surface and in spaced relation to said acoustic transducer, said lower end being located at said bottom surface, and said float being in sliding engagement with said centering rod;
   said transducer disposed directly above the reflective portion of said float; and an interface circuit connected to said transducer and arranged to measure an elapsed time between transmission of said acoustic signal to receiving of said reflected signal, and produces an output as a function of said elapsed time that is indicative of the fuel level in the fuel tank.

2. The system of claim 1 wherein said reflective portion is concave.

3. The system of claim 1 wherein said reflective portion further comprises a reflective material chosen from metal or epoxy, said reflective portion being integral to said float.

4. The system of claim 1 wherein said float is made from an elastomer having a density from about 9.9–12.6 lb/ft$^3$.

5. The system of claim 1 wherein said float further comprises an index feature and said centering rod further comprises a mating feature for sliding engagement with said index feature and preventing said float from rotating about said centering rod.

6. The system of claim 1 further comprising a spring for biasing said centering rod against said bottom surface.

7. The system of claim 1 wherein said output comprises a voltage value.

8. The system of claim 1 wherein said output comprises a resistance value.

9. The system of claim 1 wherein said output comprises a current value.

10. The system of claim 1 wherein said output comprises a network message value.

11. A fuel tank system providing an electrical indication of fuel level in the fuel tank, said system comprising:
    a fuel tank having a bottom surface and a top surface in spaced relation thereto;
    an acoustic transducer mounted in said top surface, said transducer transmitting an acoustic signal and receiving a reflected signal, said signals traveling along an axis normal to the surface of the fuel;
    a float for remaining buoyant at the surface of the fuel in the tank, said float having a reflective portion for receiving said acoustic signal and reflecting therefrom said reflected signal; and
    an interface circuit connected to said transducer and arranged to measure an elapsed time between transmission of said acoustic signal to receiving of said reflected signal, and produces an output as a function of said elapsed time that is indicative of the fuel level in the fuel tank;
    a centering rod parallel to said axis and having an upper end and a lower end, said upper end of said centering rod being fixed at said top surface and in spaced relation to said acoustic transducer, said lower end being located at said bottom surface, and said float being in sliding engagement with said centering rod;
    wherein said float further comprises a friction reducing feature for contacting the centering rod.

12. A method for measuring the level of fuel in a fuel tank, the method comprising:
    providing a float having a reflective surface on the surface of the fuel;
    from a fixed transducer disposed directly above the reflective surface of said float, transmitting an acoustic wave and receiving a wave reflected back from the reflective surface and wherein said reflective float has a parabolic surface for reflecting said acoustic wave toward said fixed transducer;
    measuring the time elapsed between transmitting of the acoustic wave and receiving the reflected wave; and
    determining the level of fuel in the tank as a function of the measured elapsed time.

* * * * *